United States Patent Office 3,697,438
Patented Oct. 10, 1972

3,697,438
FINE PAPER MILL DEFOAMER AND ITS USE
Hillel Lieberman, Andalusia, Pa., assignor to Betz Laboratories, Inc., Trevose, Pa.
No Drawing. Filed Dec. 14, 1970, Ser. No. 98,062
Int. Cl. B01d *17/00*
U.S. Cl. 252—321      10 Claims

ABSTRACT OF THE DISCLOSURE

The present invention is directed to a method and composition for controlling foam in aqueous systems and in particular paper making systems. The method basically comprises adding to foam-prone areas of the systems a composition comprising a mineral oil, a mixture of polyethylene glycol esters, a polypropylene glycol and a fatty alcohol.

BACKGROUND OF THE INVENTION

As is well known in the paper making industry, foam is an undesirable byproduct which is encountered in different areas of the paper making process. In any system where there is an aqueous medium which contains both dissolved and undissolved solids and where there is a great deal of agitation, foam is a potential problem. Since paper making processes meet with all of the prerequisites, the systems are constantly being plagued by foam. Accordingly, the industry is constantly seeking out new materials to either prevent or control foam during the paper making process since the presence or absence of foam not only bears directly on the quality of the paper produced but also upon the economies of the process.

In this regard one might consider the Fourdrinier machine which, although basically an excellent paper making system, can be put out of operation by and until foam problems are brought within reasonable control.

Also of importance is the fact that although the foam situation may not be sufficiently severe to shut down the machine, it may be so severe as to drastically affect its production speed. To mill personnel, this is not satisfactory since production is required to meet certain demands not only from the standpoint of quality but also from the standpoint of tons produced.

Areas in the Fourdrinier machine where foam may become a problem are areas such as the headbox, on the wire itself, the wire-pit, seal pits from the suction boxes and rolls, drop-leg and tray run-off, saveall, blend chest and machine chest.

Certain defoamer compositions are presently being supplied to the industry, however, those compositions which are having reasonable success in controlling foam during the paper making process suffer from some attendant disadvantages. The products are supplied as either flakes or bricks. As with any solid reagents, the time consumed in weighing and feeding the solids is considerable, and of course is less convenient than using a liquid which is fed by accurate metering devices.

In addition the waxes or fatty acids which are used as lubricants, molding materials, and active constituents in the production of flakes and bricks, add a deposition factor since these materials are not soluble in the aqueous medium and consequently deposit on the equipment, the pulp, and the paper itself. The liquid mineral oil based materials are much more effective in this respect since the oil is emulsified and can be drained with the water.

Accordingly, it was the present inventor's intention to develop a product which would not only eliminate and/or control foam but one which was liquid and did not possess the attendant drawbacks of the solid products currently being used, i.e., eliminate deposition caused by waxes and/or fatty acids.

GENERAL DESCRIPTION OF THE INVENTION

The present inventor discovered that if a composition comprising a polyethylene glycol (350–450) dioleate, a polyethylene glycol (350–450) monooleate, a polyethylene glycol (550–650) dioleate, a tallow alcohol, i.e., an alcohol comprised of a mixture of $C_{16}$ and $C_{18}$ alcohols, a polypropylene glycol and a mineral oil was added to an aqueous system, and in particular the aqueous system of a paper making process, that the system was controlled to such an extent that foam problems normally encountered were either eliminated completely or reduced to an acceptable degree.

The effective and economic treatment levels for the inventive composition were determined to be within the range of from about 0.01 to about 1% by weight of the foam controlling composition based upon the weight of the dry solids content of the aqueous system. Although, as explained above, many factors can cause or contribute to the production, existence and maintenance of foam in an aqueous system, the prime factor is considered to be the "solids content" of the system. In many instances this factor has been used in the industry to approximate basic, treatment levels. However, the most general practice is to add on a weight basis from about 1 to about 100 parts of the composition per million parts of the aqueous system, since most foam problems are controlled using treatment levels within the range. Although treatment levels above 1% based upon solids content or 100 p.p.m. based upon weight of system, are quite effective in controlling foam, the use of excesses above these levels are prohibitive due to economic considerations. Accordingly, the upper treatment level is predicated upon cost considerations rather than limit of effectiveness.

The composition of the invention contains as its major constituents, on a weight basis, from about 10% to about 30%, preferably from 15% to 25% of the polyethylene glycol 350-450, preferably the 400, dioleate; from about 5% to about 20%, preferably 7%–14% of the polyethylene glycol 550–650, preferably the 600, dioleate; from about 1%–8%, preferably from 3%–7% of the polyethylene glycol 350-450, preferably the 400, monooleate; from about 2% to about 6%, preferably 3% to 5% of the fatty alcohol (tallow alcohol containing $C_{16}$-$C_{18}$ alcohols); from about 1% to about 30%, preferably from 15% to 25% of the polypropylene glycol and from about 15% to about 70% of the mineral oil or mixtures thereof.

In addition solubilizing agents such as the lower alkenols may be included to the extent of from 1% to about 8%, preferably from about 3% to about 7% by weight of the composition. Agents of this nature are used to provide cold temperature stability in those areas and applications which require this feature. The foregoing recitations relative to the composition, although the most effective, are not necessarily the only percentages of each that may be utilized. The percentages recited represent the desirable ranges from both an effectiveness point of view and an economics point of consideration.

It should perhaps be explained that the number which appears after the polyethylene glycol in the above designations represents the degree of polymerization of the polyethylene glycol. More specifically, the number appearing in the designation "polyethylene glycol (350–450) dioleate" indicates that the number of ethylene oxide units in the compound of polymer are such as to yield a total molecular weight of 350–450. Likewise with the "monooleate" polymer and "550-650 dioleate" polymer or product.

The fatty alcohol which is to be used in accordance with the present invention may be best exemplified by the well-known "tallow alcohol" which is a mixture basically of alcohols containing 16 and 18 carbon atoms.

The polypropylene glycol is the standard low molecular weight product generally used as surfactants and spreading agents.

Basically any mineral hydrocarbons are operable with the present invention. However, the most desirable are the mineral oils such as paraffinic oils, naphthenic oils, halogenated products of these oils, kerosene, mineral seal oils and similar petroleum fractions. The mineral hydrocarbons should preferably possess a viscosity of about 30 to 400 SUS (100° F.), have a boiling point above 150° F. and be liquid at room temperatures.

Additional agents such as the lower alkanols, e.g., isopropanol, may be incorporated as solubilizing and stabilizing agents.

The composition of the invention can be made simply by mixing the ingredients thoroughly, heating the mixture to a temperature of from about 115 to 150° F. for a time to insure that the ingredients have been dissolved and thoroughly incorporated. The blend is then cooled slowly to 100° F. and at this point other ingredients such as the solubilizing agent may be added. The product is then ready for use.

In order to determine the foam controlling capacity of the composition of the present invention, a test procedure was used which placed the sample stock solutions under agitation conditions similar to those experienced in the actual paper making process.

In order to more accurately assimilate the conditions of a paper making process, actual stock samples are obtained directly from paper mills. These stock samples were approximately 0.5% consistency. More specifically, the stock is comprised of approximately 99.5% aqueous medium and approximately 0.5% fiber, filler, coloring agent, etc. The stock is that which would be fed from the headbox of a paper making machine to the Fourdrinier wire where paper formation initially occurs.

The test procedure used required 600 milliliters of the stock solution.

Test procedure

The stock is circulated from a calibrated reservoir holding the stock to and through a pump and back to the reservoir. This action agitates the stock and simulates the conditions which are normally encountered during the paper making process. The reservoir is calibrated in centimeters in order to measure the foam height at various time intervals, which is a mode of measuring the degree of foaming of a system or in other terms, the defoaming or antifoaming action of the composition. The height of the foam is noted at various intervals and the longer the time required for the foam to reach a certain level the better the inhibiting properties of the composition. The calibrations of the reservoir range from 0 to 300 centimeters with the normal slurry volume taking up the first 100 cm. A reading therefore of "100" means that essentially no foam formed during the respective period. The last reading is made when the foam overflows the reservoir or exceeds the 300 centimeter level.

When the flow takes place, the pump is then turned off. The test is an excellent measure of the defoaming characteristics of a composition since it is quite stringent.

The following compositions were produced for testing in accordance with the test procedure:

EXAMPLE 1

The following ingredients in the percentage by weight indicated were mixed at room temperature:

| | Percent |
|---|---|
| Polyethylene glycol 400 dioleate | 20 |
| Polyethylene glycol 600 dioleate | 10 |
| Polyethylene glycol 400 monooleate | 5 |
| Tallow alcohol (mixture $C_{16}$–$C_{18}$ alcohols) | 4 |
| Polypropylene glycol | 20 |
| Isopropanol | 6 |
| Alpha Oil C (a paraffinic hydrocarbon mineral oil having a specific gravity of 0.86 at 60° F. and an SUS of 150 at 100° F.—produced by Atlantic Corporation) | 24 |
| Reprol (Atlantic Corporation's refined mineral seal oil having an SUS of 40 at 100° F. and a boiling point of 510° F.) | 11 |

The resulting medium (except isopropanol) was heated to a temperature of 135° F. for a period of twenty minutes at which time all ingredients had dissolved. The product was then allowed to cool to 100° F. slowly. The isopropanol was then added and the mixture was stirred until homogeneous.

EXAMPLE 2

The product of this example was prepared in the same manner as Example 1. The ingredients used were as follows:

| | Percent |
|---|---|
| Polyethylene glycol 400 dioleate | 20 |
| Polyethylene glycol 600 dioleate | 10 |
| Polyethylene glycol 400 monooleate | 5 |
| Tallow alcohol | 4 |
| Polypropylene glycol | 20 |
| Alpha Oil C | 41 |

EXAMPLE 3

The product of this example was produced in accordance with Example 1 with the same ingredients in the percentage by weight excepting that the mineral oil was completely Reprol used in an amount of 35% by weight.

EXAMPLE 4

The product of this example was produced in accordance with Example 1. The ingredients were as follows:

| | Percent |
|---|---|
| Polyethylene glycol 400 dioleate | 20 |
| Polyethylene glycol 600 dioleate | 20 |
| Polyethylene glycol 400 monooleate | 5 |
| Tallow alcohol | 4 |
| Polypropylene glycol | 8 |
| Reprol | 43 |

Table 1

A stock sample was obtained from a fine paper producing mill located in Maine. The stock samples into which were incorporated 0.01 gram of the products noted were subjected to the test procedure as outlined earlier. The 0.01 gram represented approximately 0.02% by weight of the stock sample. Recorded also is the data obtained with Company A's flake product and Company B's brick product.

| Composition of— | Form height after designated intervals in centimeters | | | | | Time in seconds of overflow, i.e. time required for foam to exceed 300 cm. |
|---|---|---|---|---|---|---|
| | 10 sec. | 20 sec. | 30 sec. | 60 sec. | 90 sec. | |
| Example 1 | 150 | 180 | 200 | 210 | 220 | 114 |
| Example 2 | 180 | 200 | 255 | 240 | 255 | 106 |
| Example 3 | 190 | 205 | 240 | 245 | 250 | 108 |
| Example 4 | 180 | 200 | 240 | 250 | 250 | 100 |
| Company A (flake) | 135 | 150 | 190 | 240 | 275 | 92 |
| Company B (brick) | 130 | 150 | 200 | 255 | | 75 |

Table 2

The compositions of the examples were again tested, however, in this instance the stock samples used were obtained from a fine paper producing mill located in Wisconsin. The consistency of the stock was like that of the Maine mill. Accordingly the feed rate of the products was the same.

| Composition of— | Form height after designated intervals in centimeters | | | | | Time in seconds of overflow, i.e. time required for foam to exceed 300 cm. |
|---|---|---|---|---|---|---|
| | 10 sec. | 20 sec. | 30 sec. | 60 sec. | 90 sec. | |
| Company B (brick) | 150 | 180 | 220 | 270 | | 72 |
| Example 1 | 125 | 140 | 160 | 190 | 240 | 105 |
| Example 2 | | | 140 | 155 | 175 | 135 |
| Sample stock obtained from third source | | | | | | |
| Example 1 | 130 | 160 | 195 | 200 | 205 | 120 |

From the results obtained and tabulated in the foregoing tables, it is evident that the compositions of the present invention performed the function desired on a laboratory scale.

FIELD EVALUATIONS (1) In order to establish the effectiveness of the products on an actual running machine, the product of Example 1 was used on two Fourdrinier machines at a mill located in the northeastern part of the United States.

The stock running at the time was made up of kraft, groundwood, and coated broke. The number 1 machine operated at a speed so as to produce in the vicinity of 230 tons of paper per day. The feed rate of the product measured in accordance with normal mill methods measured 0.81 lb./ton of paper produced or 74 lbs./day.

The number 2 machine which was running the same type stock produced 155 tons per day and the feed rate of the product measured 0.81 lb./ton or 126 lbs./day.

The points of application on both machines were at the tray run-offs. The defoamer previously used was a flake defoamer used at a rate of 0.38 lb./ton or 89 lbs./day on the number 1 machine and 0.93 lb./ton or 144 lbs./day on the number 2 machine.

The observations and the conclusions for both machines were as follows:

On both machines there was a Deculator with a chart and with the addition of the product of Example 1, the level of the Deculator went up indicating less air entrained in the system and less likelihood of a foaming problem. There was less foam visible in the trays as compared to the foam level when the flake material was used.

Upon a long term run, there was evidence that there was comparatively less deposit on the uhle boxes and on the felts. This was a clear improvement since with the use of flakes, deposits of wax etc. were constantly found which were undesirable.

(2) In order to evaluate the product of Example 2, a field evaluation was set up at a paper mill which was producing a telephone directory grade paper. This paper was being made from a furnish of semi-chem pulp and waste tab cards. The machine pH was 4.5 and the furnish additives were alum and clay. The sheet produced was 22.5 pounds. The feed rate equaled 15 cc. per minute. After 1.5 hours of operation, foam control was excellent as with the remaining duration of the run. Additional material was furnished to the mill and after 6 months, the product was operating effectively and had replaced a brick product which the mill had been using prior to the use of the product of Example 2. The product of Example 2 was more easily fed, more effective from a cost-performance standpoint and did not leave deposits as customarily experienced with brick products.

From the foregoing then it was evident that the compositions of the method operated effectively to achieve the goals demanded.

The foregoing examples were used as illustrations of the invention. Modifications of the invention, i.e., increasing or decreasing the content of the respective materials within of course the range disclosed or the substitution of obvious equivalents also operate quite effectively for the purpose.

Accordingly having described the invention, what is claimed is:

1. A method for controlling foam in an aqueous fine paper making system which comprises adding thereto an amount effective for the purpose of a composition comprising on a weight basis, from about 10% to about 30% of a polyethylene glycol 350–450 dioleate, from about 5% to about 20% of a polyethylene glycol 550–650 dioleate, from about 1% to about 8% of a polyethylene glycol 350–450 monooleate, from about 2% to about 6% of a fatty alcohol, from about 1% to about 30% of polypropylene glycol and from about 15% to about 70% of a mineral oil.

2. A method according to claim 1 wherein the composition contains from about 1% to about 8% of a lower alkanol.

3. A method according to claim 1 wherein the composition is added to said aqueous system at a rate of from about 1 to about 100 parts by weight of said system.

4. A method according to claim 3 wherein said composition contains from about 1% to about 8% of a lower alkanol.

5. A method according to claim 1 wherein said aqueous system is a paper producing system.

6. A method according to claim 5 wherein the composition is added to said system at a rate of from about 1 to about 100 parts by weight per million parts by weight of system.

7. A method according to claim 5 wherein said composition contains from about 1% to about 8% of a lower alkanol.

8. A method according to claim 1 wherein the composition comprises from about 15% to about 25% of polyethylene glycol 400 dioleate, from about 7% to about 14% of polyethylene glycol 600 dioleate, from about 3% to about 7% of polyethylene glycol 400 monooleate, from about 3% to about 5% of tallow alcohol, from about 15% to about 25% polypropylene glycol and from about 15% to about 70% of mineral oil or mixtures thereof.

9. A method according to claim 8 wherein the composition contains from about 3% to about 7% of a lower alkanol.

10. A method according to claim 8 wherein the system is a fine paper producing system and the composition is added thereto in an amount ranging from about 1 to about 100 parts per million.

References Cited

UNITED STATES PATENTS

| | | | |
|---|---|---|---|
| 2,727,009 | 12/1955 | Jurisch | 252—321 |
| 2,727,867 | 12/1955 | Denman | 252—321 |
| 2,797,198 | 6/1957 | Chappell, Jr. | 252—321 X |
| 2,868,734 | 1/1959 | De Castro et al. | 252—358 |

JOHN D. WELSH, Primary Examiner

U.S. Cl. X.R.

162—72; 252—358